(12) United States Patent
Dirson et al.

(10) Patent No.: US 11,012,479 B2
(45) Date of Patent: May 18, 2021

(54) METHODS FOR CAPTURING AND BROADCASTING USER COMPUTER SESSIONS AND RELATED COMPUTER PROGRAM PRODUCTS

(71) Applicant: BLADE, Paris (FR)

(72) Inventors: Yann Dirson, Nanterre (FR); Grégory Gelly, Paris (FR)

(73) Assignee: BLADE, Paris (FR)

( * ) Notice: Subject to any disclaimer, the term of this patent is extended or adjusted under 35 U.S.C. 154(b) by 0 days.

(21) Appl. No.: 16/353,828

(22) Filed: Mar. 14, 2019

(65) Prior Publication Data
US 2020/0162520 A1  May 21, 2020

(30) Foreign Application Priority Data
Nov. 16, 2018  (FR) ..................................... 1860640

(51) Int. Cl.
*H04L 29/06* (2006.01)
*G06T 1/20* (2006.01)

(52) U.S. Cl.
CPC ............ *H04L 65/1069* (2013.01); *G06T 1/20* (2013.01); *H04L 65/4023* (2013.01); *H04L 65/607* (2013.01)

(58) Field of Classification Search
CPC ............. H04L 65/1069; H04L 65/4023; H04L 65/607; G06T 1/20
See application file for complete search history.

(56) References Cited

U.S. PATENT DOCUMENTS

| | | | |
|---|---|---|---|
| 8,705,616 B2 * | 4/2014 | He | H04N 19/30 375/240.02 |
| 9,426,505 B1 * | 8/2016 | Hundemer | H04H 20/10 |
| 2008/0145830 A1 * | 6/2008 | Huang | G09B 9/00 434/336 |
| 2009/0248828 A1 * | 10/2009 | Gould | H04N 21/814 709/207 |
| 2017/0228851 A1 | 8/2017 | Freund et al. | |

FOREIGN PATENT DOCUMENTS

| | | |
|---|---|---|
| FR | 3031644 A1 | 7/2016 |
| FR | 3047576 A1 | 8/2017 |
| WO | 2009/073796 A1 | 6/2009 |
| WO | 2011/163388 A1 | 12/2011 |
| WO | WO-2011163388 A1 * | 12/2011 ............... G06F 3/14 |

OTHER PUBLICATIONS

French Search Report for French Application No. 1860640 dated May 15, 2019, 2 pages.

* cited by examiner

*Primary Examiner* — SM A Rahman
(74) *Attorney, Agent, or Firm* — TraskBritt

(57) ABSTRACT

Methods for capturing and broadcasting a user computer session may involve running the session on a host computer equipped with a graphics processing unit to prepare session display data. The capturing and broadcasting method implements the operations of repeatedly providing the display data prepared by the graphics processing unit to a first encoder and a second encoder to establish a primary video stream and a secondary video stream; then transmitting the primary video stream to the remote client associated with the computer session and transmitting the secondary video stream to a subscriber client.

12 Claims, 2 Drawing Sheets

METHODS FOR CAPTURING AND BROADCASTING USER COMPUTER SESSIONS AND RELATED COMPUTER PROGRAM PRODUCTS

PRIORITY CLAIM

This application claims the benefit of the filing date of French Patent Application Serial No. 1860640, filed Nov. 16, 2018, for "Method for Capturing and Broadcasting a User Computer Session," the disclosure of which is incorporated herein in its entirety by this reference.

TECHNICAL FIELD

This disclosure concerns a method for capturing and broadcasting a user computer session.

The user computer session runs on a host computer and is broadcast to a remote client with which the session is associated. The computer session is also broadcast to a subscriber client. The disclosed subject matter finds a particular application in the field of network video games when one of the participants (the user of the remote client) wishes to share with another participant (the user of the subscriber client) the images displayed on his screen.

BACKGROUND

Documents US20170228851 and FR3047576 describe a configuration of a computer system of the cloud computing type in which the interface devices (screen, keyboard, controller . . . ) are remote from the processing and storage part of the computer session.

The interface devices are located close to the user and form a remote client. The processing and storage components making up the host computer are located in a separate hosting location that is generally remote from the remote client.

The user computer session runs on the host computer, and the host computer and the remote client exchange session information via a computer network, for example the Internet network, to which they are both connected. This session information may include images and sound intended to be reproduced on the remote client side, control data, such as those from the remote client's interface devices, intended to be communicated to the host computer. This emulates, for the user, the presence of a high-performance physical computer without the need to directly own or have such equipment.

Some computer applications require or can take advantage of the ability of the user to share its computer session with at least one other participant. For example, it involves sharing the images produced by the computer session and displayed on the screen of the remote client with said other participant. It may also involve sharing or giving control of the session to said other participant, with whom he or she can interact, for example, through his or her keyboard and mouse.

This is particularly the case in on line games where a group of players may wish to share their respective screens with each other in order to have a more global view of the environment in which they operate. This may also be the case in the field of distance learning where a teacher may wish to access the images displayed on his or her student's screen and possibly take control of the session to, for example, guide or correct it.

Regardless of the application justifying the need to share session information, it is necessary to simultaneously transmit session information from the host computer to the remote client and the subscriber(s), i.e., to the additional computer workstation(s) on which the session information is to be duplicated.

The tasks of duplicating, preparing and sending this information may exceed the processing capacity of the host computer or the transmission capacity of the computer network. In this case, the quality of the service provided to the user, at the remote customer or subscriber customer level, is deteriorated. This decrease in quality can result in an increase in latency time, i.e., the time between the preparation of an image or sound by the host computer and its playback by the remote or subscriber client. The decrease in quality may also result in a decrease in the resolution of the transmitted images or in the refresh rate of these images.

The subject matter of this disclosure aims to solve at least part of this problem. More specifically, it refers to a method for capturing and broadcasting a user computer session that can be adjusted to the available processing capacity of the host computer and/or the transmission capacity of the network in order to attempt maintaining a satisfactory level of service for the remote customer user and/or the subscriber customer user.

BRIEF SUMMARY

In order to achieve one of these purposes, the subject matter of this disclosure proposes a method of capturing and broadcasting a user computer session, the session running on a host computer equipped with a graphics processing unit to prepare session display data, the capture and broadcasting method implementing the following operations:

repeatedly providing the display data prepared by the graphics processing unit to a first encoder to establish a primary video stream;

transmitting the primary video stream to a remote client associated with the computer session.

According to this disclosure, the method also involves operations consisting of:

repeatedly providing the display data to a second encoder to establish a secondary video stream;

transmitting the secondary video stream to a subscriber customer.

By preparing the primary video stream for the remote client and the secondary video stream for the subscriber client separately, on two different encoders, the bit rates of these two streams can be set and/or adjusted individually. In particular, the quality of the video stream addressed to the subscriber customer can be adjusted to the available processing capacity of the host computer and/or the transmission capacity of the network, without affecting the quality of the video stream addressed to the remote customer.

According to other advantageous and non limiting characteristics of the disclosed subject matter, taken alone or in any technically feasible combination:

the method also includes operations to configure the first encoder and the second encoder;

the operations to configure the first encoder and the second encoder define a ceiling bit rate of the primary video stream and a ceiling bit rate of the secondary video stream;

the secondary video stream has a different ceiling bit rate than the ceiling bit rate of the primary video stream;

the operations to configure the first and second encoders are a preconfiguration step that precedes the steps to repeatedly provide display data and broadcast video streams;

the operations to configure the first and second encoder are repeated to dynamically adjust the bit rate of the primary video stream and/or the bit rate of the secondary video stream;

the host computer includes a virtual machine that runs on a server;

the graphics processing unit, the first encoder and the second encoder are carried by a graphics card of the server, the graphics card being entirely dedicated to the virtual machine;

the method also includes operations to successively capture sound data, and transmit the successive sound data to the remote client and/or the subscriber client;

the method includes operations for receiving control data from the subscriber customer, interpret the control data to initiate and/or interrupt steps for transmitting the secondary video stream to the subscriber customer;

the operations for repeatedly providing display data to the first and second encoder include reading display data from a buffer memory of the graphics processing unit;

the operations for transmitting the primary video stream to the remote client and the operations for transmitting the secondary video stream to the subscriber client include providing the primary and secondary video streams to a network controller;

the secondary video stream is transmitted to a plurality of subscriber customers.

The invention also concerns a computer program containing instructions suitable for carrying out the operations of the capture and broadcasting method when this method is executed on a host computer.

BRIEF DESCRIPTION OF THE DRAWINGS

Other characteristics and advantages of the subject matter of this disclosure will be readily apparent from the detailed description of the invention that follows, with reference to the attached figures, among which.

DETAILED DESCRIPTION

IT Architecture

Figure 1:
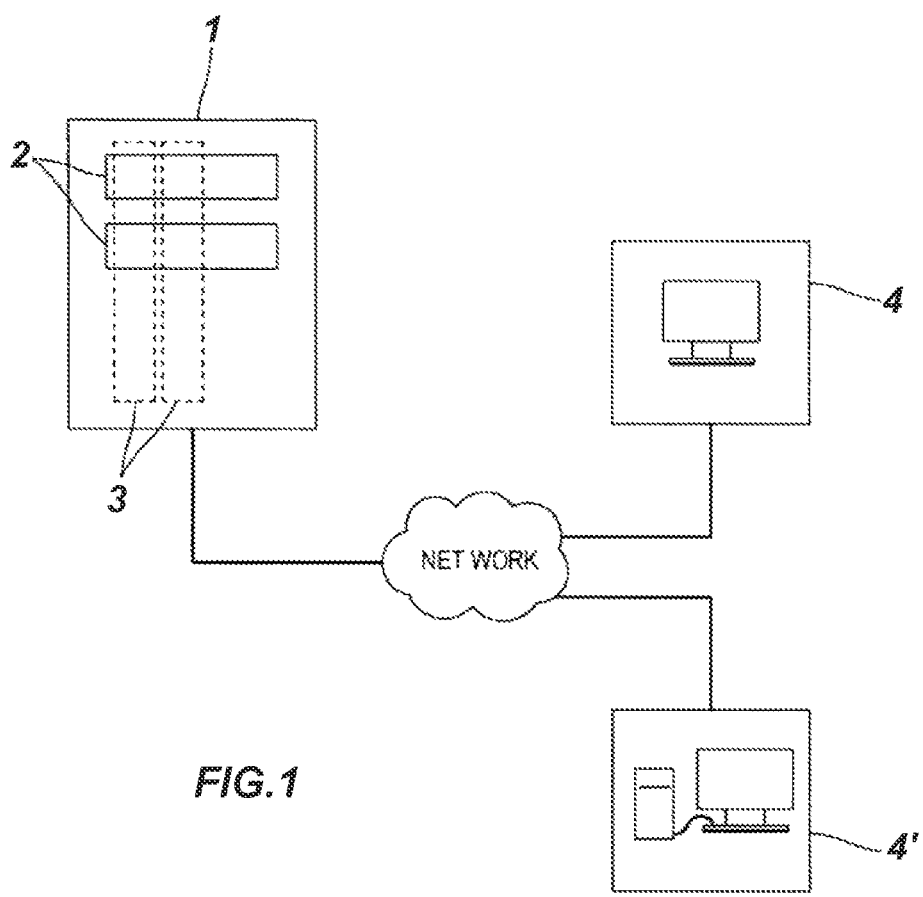
FIG. 1 represents an IT architecture for implementing the capture and broadcasting method.

FIG. 1 represents a computer architecture for implementing the capture and broadcasting method of this description.

This architecture is formed here by a host computer 1 that has a plurality of servers 2. Servers 2 are made up of high-performance components (CPU, memory, storage disk, graphics and network cards, etc.) to form a particularly efficient hardware platform for running applications that may require significant processing capabilities, such as video games.

As is well known, servers 2 can be configured to host one or more virtual machine(s) 3, together with their operating system and applications. Virtualization allows a plurality of virtual machines 3 to be hosted in each server 2 to provide a plurality of virtual environments that are completely isolated from one another. Each virtual environment has access to the server's hardware resources (CPU, memory, storage media, graphics card, etc.) to run a user computer session. Well-known virtualization technologies include CITRIX XENSERVER®, MICROSOFT HYPER-V™, VMWARE ESXI™, ORACLE VIRTUALBOX™, Quick Emulator under the GNU Open License (QEMU), etc.

Each of the virtual machines 3 in host computer 1 can be dedicated to a specific user. Users interact with their dedicated virtual machines 3 from remote clients 4, 4', each connected to the host computer 1 via a network such as the Internet. Since most, if not all, of the processing is done on the host computer 1, remote clients 4, 4' can remain very simple, and may include, for example, a simple terminal, a network connector and basic I/O devices (keyboard, mouse . . . ) as represented by the first remote client 4 in FIG. 1. Alternatively, it may be a standard personal computer, with its own CPU, graphics card, peripherals, or a tablet or smartphone, as represented by the other remote client 4'. Not all computing devices 4, 4' in communication with the host computer 1 are necessarily associated with a virtual machine (and therefore do not form a remote client, as defined in this description). Some can be equipped with all the necessary hardware and software resources, so that all session processing is performed locally. Therefore, it does not benefit from the processing resources provided by host 1's servers 2. However, they can interact, i.e., exchange information, with user sessions running on servers 2.

Each server 2 preferably hosts less than ten virtual machines 3 to provide sufficient IT resources, including hardware, for each virtual machine 3 to run high-performance applications with an adequate level of service. Each virtual machine 3 is created at the time of the client's connection to host computer 1 and includes a virtual mainframe, virtual main memory, and all other necessary resources.

The virtual machine has or has access to a graphics processing unit to prepare session display data. This graphics processing unit can include a simple hardware video card or a hardware graphics card associated with the virtual machine. It can also be a virtual video card or a virtual graphics card entirely emulated by the server's hardware resources (including its processing unit(s) and/or graphics card(s)), these resources being made available to the virtual machine by the virtualization software layer (hypervisor) running on the server. This graphics processing unit can also mix hardware and virtual elements.

Preferably, and according to a particular embodiment ensuring a high level of performance, the graphics processing unit corresponds to a high-performance physical graphics card, associated and entirely dedicated to a virtual machine.

Whatever its nature, hardware or virtual, the graphic processing unit associated with the virtual machine serves to prepare and provide display data for the computer session running on the virtual machine.

This processing unit also includes a plurality of video encoders capable of forming video streams. As a reminder, the function of a video encoder is to process image data, provided as input, to prepare a compressed video stream and provide it as output. For example, it may be an encoder implementing the H.264 or H.265 standard. Such an encoder is usually configured so that the video stream it prepares has a bit rate that is no higher than a ceiling bit rate, which can be chosen. To limit the bit rate of the video stream to the ceiling bit rate, the encoder may degrade the quality of the images forming the compressed video stream. Of course, the lower the ceiling bit rate, the lower the perceived quality of the video stream. As is well known per se, compression is achieved by transmitting only the differences between the data of two successive images (or even only some of these differences). It is planned to regularly insert complete images (referred to as the "reference image") into the compressed video stream in order to initiate the decoding of the compressed video stream and to avoid any drift in this decoding over time. The encoder can be configured to insert, on request, such a reference image, and more generally to adjust the compromise between the encoding time required and the quality of the video stream provided.

A "plurality of encoders" refers to at least one encoding unit that can be used to provide at least two video streams that are independent of each other. This can be a single hardware encoder on a graphics card, of which the running context can be changed to form at least two separate video streams concurrently. It can of course be a plurality of hardware encoders physically distinct from each other and respectively used to form a plurality of flows. Alternatively, these encoders can also be built in purely software form. Whichever solution is chosen, it is possible to form a plurality of video streams by individually controlling the characteristics of each of these streams, including their bit rates.

Each virtual machine 3 emulates a high-performance virtual personal computer that is associated and controlled by a remote client 4, 4'. Each virtual machine 3 is therefore, or equivalent to, a user session, and many of these user sessions can be run on servers 2 of the host computer 1. The computing architecture can include a plurality of interconnected host computers 1, which may be located in geographically separate data centers.

To display the images of the user session on the remote client terminal associated with it, host computer 1 provides the remote client 4, 4' with display information (including sound) and control information for the input/output devices installed at the remote site.

In contrast, remote clients 4, 4' provide the host computer 1 with control information from the input/output devices on the remote site (keyboard, mouse), and possibly other forms of data such as display and sound information provided by a USB device or integrated into a camera and microphone of the remote client 4, 4', or network devices, at the remote client, such as printers.

In this description, "session information" refers to all information exchanged between a remote client 4, 4' and the host computer 1.

On the host computer 1 side, a program to capture and broadcast session information runs, in the background, in each computer session. The capture and broadcast program implements operations for collecting the display, sound and control data prepared by the computer session, encoding this data to limit the use of network bandwidth and transmitting it to the remote client 4, 4'. The capture and broadcast program also receives and decodes the control data communicated by the remote client 4, 4', uses it or provides it to the user session for conventional processing and exploitation.

The remote clients 4, 4', on their side, are equipped with appropriate hardware and/or software resources to decode the information communicated by the capture and broadcasting program so that it can be used on the client side. These resources also allow the control data generated by the remote client to be prepared and transmitted to the host computer 1. In addition to data from the remote client's interface devices (keyboard, mouse, etc.), control data may include additional information, such as information on the data rate received from the host computer, to characterize the quality of the link with that computer.

As will be detailed in more detail later in this description, this invention is intended to allow the broadcasting of session information not only to the remote client with which the session is associated, but also to other clients, subsequently referred to as "subscriber" clients. Subscriber clients can be associated with their own sessions running on the host computer.

Broadcasting Set-Up Program and Subscription Protocol

The user of a session running on host computer 1 can set, using a broadcast set-up program running in his session or on the remote client, the conditions under which his session information is broadcast to one or a plurality of subscriber client(s). Thus, each user can edit, modify, save entries from a list of subscriber customers that he/she authorizes or designates to receive session information. This subscription list can be maintained outside the user session by host computer 1, so that information about all user sessions can be grouped centrally on it. This list can link a session ID and remote subscriber IDs authorized to, or designated to, receive communication of session information.

The configuration can be more complex than simply allowing or blocking delivery to a subscriber client. For example, a user session may include multiple desktops or screens, and the broadcasting settings may indicate which desktop or screen can be broadcast to the subscriber client. The configuration can also allow or block the transmission of sound and/or control information, regardless of whether pure display data is allowed or blocked. In particular, the configuration can determine the extent to which command data (keyboard keys, mouse movements, etc.) provided by a subscriber client can be used by the user session, which would consist in sharing session control with the subscriber client's user. The special conditions that apply to exchanges between a session and a subscriber customer are also recorded in the subscription list.

To obtain session information from a specified user session, a subscriber client 4, 4' connects to host computer 1 during a subscription step. In this step, host computer 1 checks that the subscriber client is authorized to be connected to the specified user session. Host computer 1 also provides the user session and the subscriber client with the information necessary to enable the transmission of session information.

Other protocols than the one described above can be considered to configure the transmission of information between a session and a remote client. For example, host computer 1 can maintain a list of grouped user sessions. Each user session (and more specifically each capture and broadcasting program) in the group is then configured by the host computer 1, so that it can broadcast session information to remote clients associated with the other sessions in the group.

Whichever protocol is chosen to connect a user session to one or more subscriber clients, it is intended to provide the user session capture and broadcasting program with an identifier of at least one subscriber client with which at least a portion of the session information can be exchanged.

Capture and Broadcasting Program

Figure 2:
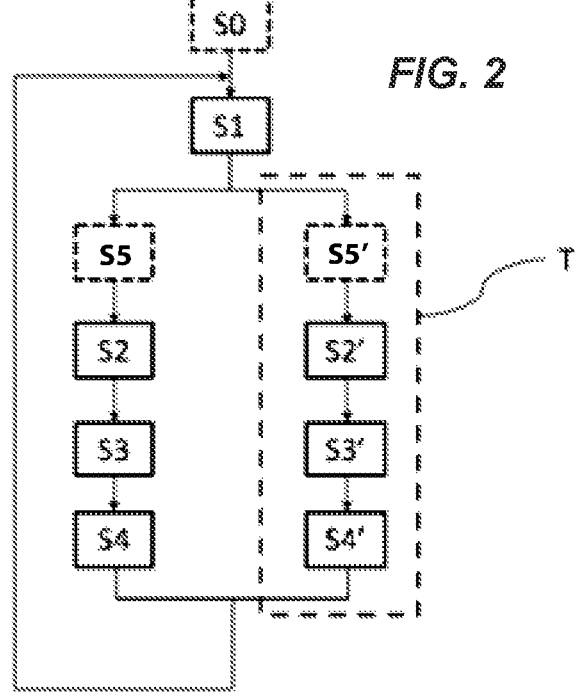
FIG. 2 schematically represents a capture and broadcasting method according to this disclosure.

The subject matter of this disclosure seeks to take advantage of the computer environment just described to propose a method for capturing and broadcasting the user computer session for better adjusting to the processing capacity available on host computer 1 and the transmission capacity of the network connecting that computer to the remote client and subscriber client(s) 4, 4'. The method is represented on FIG. 2.

As described above, the user computer session runs on host computer 1 and uses the processing capabilities of a graphics processing unit that prepares the session display data. This display data is repeatedly provided by the graphics processing unit to a buffer memory of this unit or associated with this unit. Display data can, for example, be prepared and provided every 4 to 35 milliseconds by the graphics processing unit.

The capture and broadcasting program that runs in the computer session of host computer 1 implements operations for repeatedly providing the display data prepared by the graphics processing unit to a first encoder. To this end, the capture and broadcasting program provides for a step S1 of reading the display data from the buffer memory of the graphics processing unit and a step S2 of providing this data to the first encoder.

The first encoder establishes a primary video stream that is intended to be transmitted to the remote client associated with the session. The primary video stream should generally be of high quality to best serve the user of the remote client. For this purpose, the first encoder is configured with a relatively high ceiling bit rate value, e.g., higher than 1 Mb/s.

The capture and broadcasting program collects and processes the primary video stream data prepared by the first encoder in a preparation step S3, and transmits it to the remote client in a broadcasting step S4 of the primary video stream. For example, the data composing the primary video stream is extracted from a buffer memory of the first encoder or associated with this first encoder, to be formatted (i.e., packaged) in the preparation step S3 and addressed to a network controller associated with the user session in the broadcasting step S4. The capture and broadcasting program can use any protocol adapted to transmit the primary video stream to the remote client, but with a preference for low-latency protocols that are compatible with a light remote client that does not have significant IT resources. This may be, for example, a UDP protocol or a protocol derived from the UDP protocol.

To communicate the display data to at least one subscriber customer, the capture and broadcasting program also provides the display data prepared by the graphics processing unit to the second encoder. This step S2' of supplying the second encoder can be executed concurrently with the supply of this display data to the first encoder. The second encoder establishes a secondary video stream that is intended to be transmitted to the subscriber customer(s). To this end, the capture and broadcasting program collects and formats during a preparation step S3' of the secondary video stream. Then, the capture and broadcasting program, during a broadcasting step S4' of the secondary video stream, sends the secondary video stream data to the network controller in a similar way as for the transmission of the primary video stream.

It is not always necessary for the secondary video stream to be of high quality, as it provides additional information for subscriber clients. For example, this secondary video stream can be displayed on the subscriber's screen in a small window, superimposed on images representing their own user session. Therefore, the quality of the secondary video stream can be reduced in this case of use compared to the quality of the primary video stream. The first and second encoders are then configured by the capture and broadcasting program so that the secondary video stream has a lower ceiling bit rate than that of the primary video stream.

Alternatively, it may be desirable to form a secondary video stream of better quality than the primary video stream. This is the case, for example, when this secondary video stream is intended for a subscriber client with a display screen of higher quality or larger than that of the remote client.

In addition, it is possible that the secondary video stream may be sent intermittently to the subscriber client, who may choose to receive or interrupt the reception of this stream. To enable subscriber clients to decode the secondary video stream at the beginning of its reception, it is necessary to introduce reference images into the secondary video stream with a higher frequency than in the primary video stream, which can have an impact on the visual quality of the secondary video stream and its rate.

It is therefore not always necessary for the secondary video stream to have a bit rate equivalent to that of the primary video stream.

By preparing separately the primary video stream for the remote client and the secondary video stream for the subscriber(s) client(s) on two different encoders, the bit rates of these two streams can be set and/or adjusted individually, and thus also the quality of each stream.

Thus, according to an advantageous embodiment of this method, the capture and broadcasting program configures the first and second encoder so that the secondary video stream has a bit rate strictly lower than the bit rate of the primary video stream. For example, the ceiling bit rate of the secondary video stream can be set to a value 2 times, 5 times or 10 times less than the ceiling bit rate of the primary video stream.

As an alternative to this embodiment, the capture and broadcasting program can set the ceiling bit rate of the secondary video stream to be as large as possible, possibly greater than or equal to the ceiling bit rate of the primary video stream.

The configuration of the first and second encoder, including the ceiling rates of each of the primary and secondary video streams and the frequency of insertion of reference images into these streams, can be established once and for all by the capture and broadcasting program, for example during a preconfiguration step S0, at the start of the computer session. Thus, the capture and broadcasting program can preconfigure during this preconfiguration step S0 the second encoder so that a reference image is integrated into the secondary video stream at a regular time interval, which can be between a few seconds and a few tens of seconds for example. This ensures that a new remote subscriber can use the secondary video stream to decode and display it within a reasonable time after subscription and/or connection.

But advantageously, the capture and broadcasting program can dynamically adjust the respective ceiling bit rate of the primary and secondary video streams according to the measured capabilities of network transmission or host computer processing. In the case where the capture and broadcasting program detects an excessive reduction in at least one of these capabilities, it configures the first and/or second encoder with a reduced ceiling bit rate. To this end, it is possible to provide a step S5 to configure the first encoder, and a step S5' to configure the second encoder, within the sequence of operations leading to the broadcasting of the primary and secondary flows.

In the case of predominant use, the capture and broadcasting program focuses on reducing the ceiling bit rate of the secondary video stream rather than reducing the ceiling bit rate of the primary video stream. For example, the ceiling bit rates of the first and second encoder may initially be set, for example, during the preconfiguration step S0, to be identical, and the ceiling bit rate of the secondary video stream may be divided by 2, 5 or 10 when the processing capacity of the host computer or network transmission capacity deteriorates.

To enable this functionality, the capture and broadcasting program can regularly access the status information of the computer session in which it is running, this status information allowing it to determine the level of session execution performance on host computer 1 and/or network transmissions. The capture and broadcasting program can also use control data to characterize the quality of the computer link received from the remote client 4, 4' and/or remote subscribers and to individually adjust the target bit rate of the first and second encoder. The capture and broadcasting program also receives from the host computer 1 the identifiers of the subscribers as they subscribe to receive the secondary video stream.

This variant, in which the first and second encoders are dynamically configured, is particularly useful when the number of subscribers is large and it is desired to limit the total bandwidth used for session broadcasting. This variant is also advantageous when network disruptions affect one or more session flows to subscriber clients. In the latter case, it is preferable to lower the ceiling flow rate of the secondary flow without affecting the main flow, which it is not desirable to degrade.

In addition, and in an attempt to reduce the effect of reference image insertions on the bit rate of the secondary video stream, the capture program can configure the encoder during the configuration step S5' to insert a reference image into the secondary video stream only upon the express request of one of the subscriber clients, for example when connecting to a subscriber client.

In addition to the display data transmitted to clients as primary and secondary video streams, the capture and broadcasting program can simultaneously and concurrently capture the audio and/or control data prepared by the computer session and send it to the remote client and the subscriber client(s). As these data are small in size and consume little bandwidth on the computer network, they can be sent to different clients without any special processing, i.e., by sending the same data to these different clients.

As already mentioned, the capture and broadcasting program also receives from the network controller the control data prepared and sent by the remote client and the subscriber client(s). The program may apply certain processing operations to this data before forwarding it to the computer session for functional processing. For example, the capture and broadcasting program may block control data provided by subscriber clients, i.e., not forward them to the computer session, if the broadcasting settings do not allow subscriber clients to interact with the session.

According to an example of an advantageous embodiment, the capture and broadcasting program includes operations to receive control data from a subscriber client, interpret this control data to initiate and/or interrupt operations to transmit the secondary video stream to that subscriber client. In other words, the time thread of operations allowing the preparation and broadcasting of the secondary video stream to the subscriber client is implemented only on the subscriber client's instruction. In this way, this subscriber can control the sending of display data of the user session to which he/she has subscribed, from a moment and for a given duration.

For example, the capture and broadcasting program sends the secondary video stream to a particular subscriber client for a specified period of time (a few seconds) only upon receipt of specified control data (a particular key on the remote client's keyboard, for example) from that particular subscriber client. Repeated reception by the capture and broadcasting program of the determined command (the particular key of the keyboard can be kept pressed, for example) leads to the secondary video stream being continuously addressed to the particular subscriber client (and for as long as the determined key of the keyboard is kept pressed). As previously mentioned, the initiation of broadcasting by the program to capture and broadcast the secondary video stream to the subscriber client may include, during the encoder configuration step S5', the insertion of a reference image into the secondary video stream.

Of course, embodiments in accordance with this disclosure are not limited to the embodiments described and alternative embodiments can be made without departing from the scope of this disclosure, certain embodiments of which being defined by the following claims.

In particular, it is possible for several subscriber clients to subscribe to receive the display data of one user session.

In this case, it is possible to provide for the simultaneous execution of as many T-instruction threads to prepare and broadcast a secondary video stream as there are subscriber clients. Each feed then prepares and broadcasts a secondary video stream dedicated to one subscriber client. This approach requires as many encoders as there are subscribers.

Alternatively, a single secondary video stream can be prepared and broadcast to all remote subscribers within a single T-instruction thread.

The favored approach can be chosen by the user of the computer session through the configuration program. If the alternative chosen is the one where a single secondary video stream is broadcast to multiple subscriber clients, the configuration program can also be used to choose and determine whether the maximum bit rate of the secondary video stream should be adjusted to an average transmission quality existing between the host computer and the subscriber clients, or to the lowest or highest transmission quality.

Figure 3:
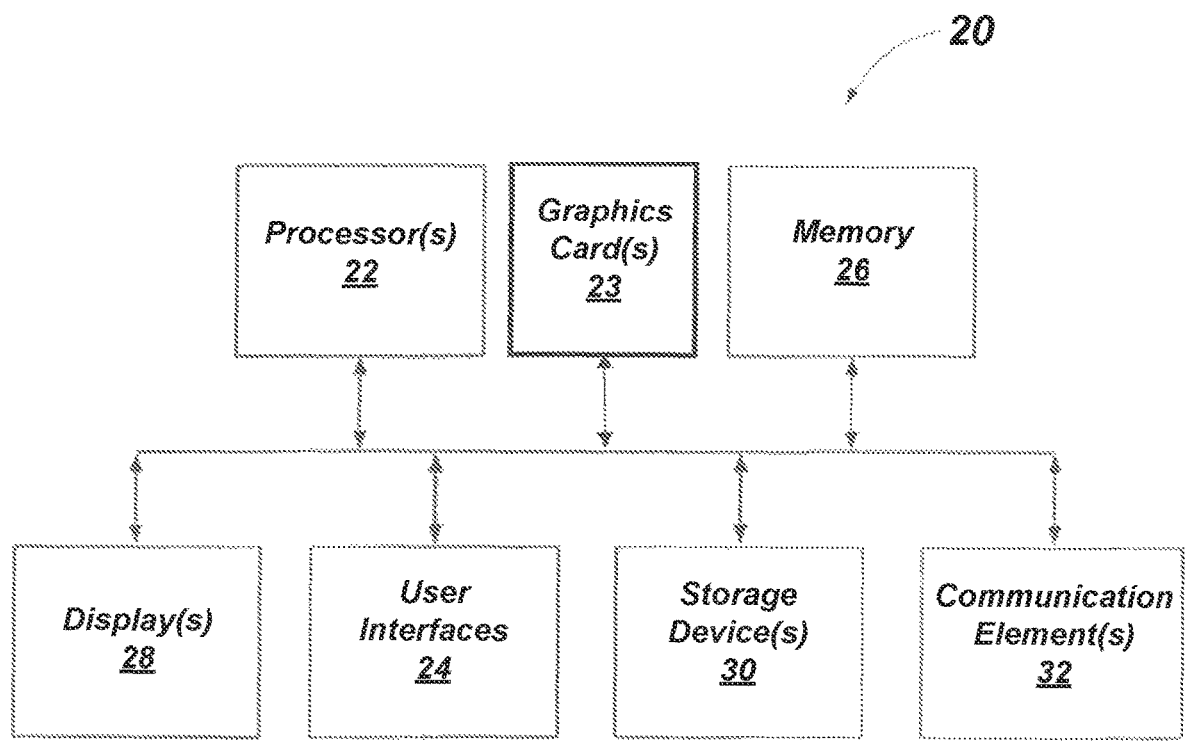
FIG. 3 is a simplified block diagram showing elements of computing devices that may be used in systems and apparatuses, and to implement methods, of this disclosure.

FIG. 3 is a simplified block diagram showing elements of computing devices that may be used in systems and apparatuses, and to implement methods, of this disclosure. A computing system 20 may be a user-type computer, a file server, a computer server, a notebook computer, a tablet, a handheld device, a mobile device, or other similar computer system for executing software. More specifically, the computing system 20 may be employed as the previously described servers 2 and/or remote clients 4, 4'. The computing system 20 may be configured to execute software programs containing computing instructions and may include one or more processors 22, memory 26, one or more displays 28, one or more user interface elements 24, one or more communication elements 32, and one or more storage devices 30 (also referred to herein simply as storage 30).

The processors 22 may be configured to execute a wide variety of operating systems and applications including the computing instructions for capturing and broadcasting a user computer session of the present disclosure.

The processors 22 may be configured as a general-purpose processor such as a microprocessor, but in the alternative, the general-purpose processor may be any processor, controller, microcontroller, or state machine suitable for carrying out processes of the present disclosure. The processor 22 may also be implemented as a combination of computing devices, such as a combination of a DSP and a microprocessor, a plurality of microprocessors, one or more microprocessors in conjunction with a DSP core, or any other such configuration.

A general-purpose processor may be part of a general-purpose computer. However, when configured to execute instructions (e.g., software code) for carrying out embodiments of the present disclosure the general-purpose computer should be considered a special-purpose computer. Moreover, when configured according to embodiments of the present disclosure, such a special-purpose computer improves the function of a general-purpose computer because, absent the present disclosure, the general-purpose computer would not be able to carry out the processes of the present disclosure. The processes of the present disclosure, when carried out by the special-purpose computer, are processes that a human would not be able to perform in a reasonable amount of time due to the complexities of the data processing, decision making, communication, interactive nature, or combinations thereof for the present disclosure. The present disclosure also provides meaningful limitations in one or more particular technical environments that go beyond an abstract idea. For example, embodiments of the present disclosure provide improvements in the technical field related to the present disclosure.

The graphics cards 23 may be a dedicated graphic processor with special architecture and instruction to perform graphic operations, or a high performance microprocessor in accordance with the foregoing description for processors 22.

The memory 26 may be used to hold computing instructions, data, and other information for performing a wide variety of tasks including capturing and broadcasting a user computer session in accordance with the present disclosure. By way of example, and not limitation, the memory 26 may include Synchronous Random Access Memory (SRAM), Dynamic RAM (DRAM), Read-Only Memory (ROM), Flash memory, and the like. The terms "memory," "memory device," and "computer readable storage medium," as used herein, shall be construed not to encompass transitory signals.

The display 28 may be a wide variety of displays such as, for example, light-emitting diode displays, liquid crystal displays, cathode ray tubes, and the like. In addition, the display 28 may be configured with a touch-screen feature for accepting user input as a user interface element 24.

As nonlimiting examples, the user interface elements 24 may include elements such as displays, keyboards, pushbuttons, mice, joysticks, haptic devices, microphones, speakers, cameras, and touchscreens.

As nonlimiting examples, the communication elements 32 may be configured for communicating with other devices or communication networks. As nonlimiting examples, the communication elements 32 may include elements for communicating on wired and wireless communication media, such as for example, serial ports, parallel ports, Ethernet connections, universal serial bus (USB) connections, IEEE 1394 ("FIREWIRE®") connections, THUNDERBOLT™ connections, BLUETOOTH® wireless networks, ZIGBEE™ wireless networks, 802.11 type wireless networks, cellular telephone/data networks, and other suitable communication interfaces and protocols.

The storage 30 may be used for storing relatively large amounts of nonvolatile information for use in the computing system 20 and may be configured as one or more storage devices. By way of example and not limitation, these storage devices may include computer-readable media (CRM). This CRM may include, but is not limited to, magnetic and optical storage devices such as disk drives, magnetic tape, CDs (compact discs), DVDs (digital versatile discs or digital video discs), and semiconductor devices such as RAM, DRAM, ROM, EPROM, Flash memory, and other equivalent storage devices. The terms "storage" and "storage device," as used herein, shall be construed not to encompass transitory signals.

A person of ordinary skill in the art will recognize that the computing system 20 may be configured in many different ways with different types of interconnecting buses between the various elements. Moreover, the various elements may be subdivided physically, functionally, or a combination thereof. As one nonlimiting example, the memory 26 may be divided into cache memory, graphics memory, and main memory. Each of these memories may communicate directly or indirectly with the one or more processors 22 on separate buses, partially combined buses, or a common bus.

What is claimed is:

1. A method of capturing and broadcasting a user computer session, the session running on a host computer equipped with a graphics processing unit to prepare session display data, the capturing and broadcasting method implementing the following operations:
    repeatedly providing display data prepared by the graphics processing unit to a first encoder presenting a first ceiling bit rate and establishing a primary video stream utilizing the first encoder;
    transmitting the primary video stream to a remote client associated with the computer session;
    repeatedly providing the same display data to a second, different encoder presenting a second ceiling bit rate different from the first ceiling bit rate and establishing a secondary video stream utilizing the second encoder; and
    transmitting the secondary video stream to at least one subscriber client; and
    wherein establishing a primary video stream utilizing the first encoder comprises in reference images into the primary video stream, and wherein establishing a secondary video stream utilizing the second encoder comprises introducing reference images into the secondary video stream, with the introduction of the reference images into the secondary video stream having a higher frequency than the introduction of the reference images into the primary video stream.

2. The method according to claim 1, further comprising configuring the first encoder and the second encoder in response to user input received from the remote client.

3. The method according to claim 2, wherein configuring the first encoder and the second encoder comprises defining the first ceiling bit rate and the second ceiling bit rate.

4. The method according to claim 2, wherein configuring the first and second encoder comprises preconfiguring the first encoder and the second encoder before repeatedly providing the display data.

5. The method according to claim 2, further comprising dynamically adjusting a bit rate of the primary video stream and/or a bit rate of the secondary video stream.

6. The method according to claim 1, further comprising running a virtual machine on a server to provide the host computer.

7. The method according to claim 6, wherein the graphics processing unit, the first encoder and the second encoder are carried by a graphics card of the server, and further comprising dedicating the graphics card entirely to the virtual machine.

8. The method according to claim 1, further comprising successively capturing sound data, and transmitting the successive sound data to the remote client and/or the subscriber client.

9. The method according to claim 1, further comprising receiving control data from the subscriber client, interpreting the control data to initiate and/or interrupt transmitting the secondary video stream to the subscriber client.

10. The method according to claim 1, wherein repeatedly providing the display data to the first encoder and the second encoder comprises reading the display data from a buffer memory of the graphics processing unit.

11. The method according to claim 1, further comprising transmitting the secondary video stream to a plurality of subscriber clients.

12. A computer program product embodied on a computer readable storage medium containing instructions that, when carried out on a host computer equipped with a graphics processing unit to prepare session display data, implements the following operations:

repeatedly providing display data prepared by the graphics processing unit to a first encoder presenting a first ceiling bit rate and establishing a primary video stream utilizing the first encoder;

transmitting the primary video stream to a remote client associated with the computer session;

repeatedly providing the same display data to a second, different encoder presenting a second ceiling bit rate different from the first ceiling bit rate and establishing a secondary video stream utilizing the second encoder; and transmitting the secondary video stream to at least one subscriber client; and wherein establishing a primary video stream utilizing the first encoder comprises introducing reference images into the primary video stream, and wherein establishing a secondary video stream utilizing the second encoder comprises introducing reference images into the secondary video stream, with the introduction of the reference images into the secondary video stream having a higher frequency than the introduction of the reference images into the primary video stream.

* * * * *